R. D. SMITH AND H. A. STEELE.
VEGETABLE SLICER.
APPLICATION FILED DEC. 16, 1918.
1,317,050.
Patented Sept. 23, 1919.
2 SHEETS—SHEET 1.
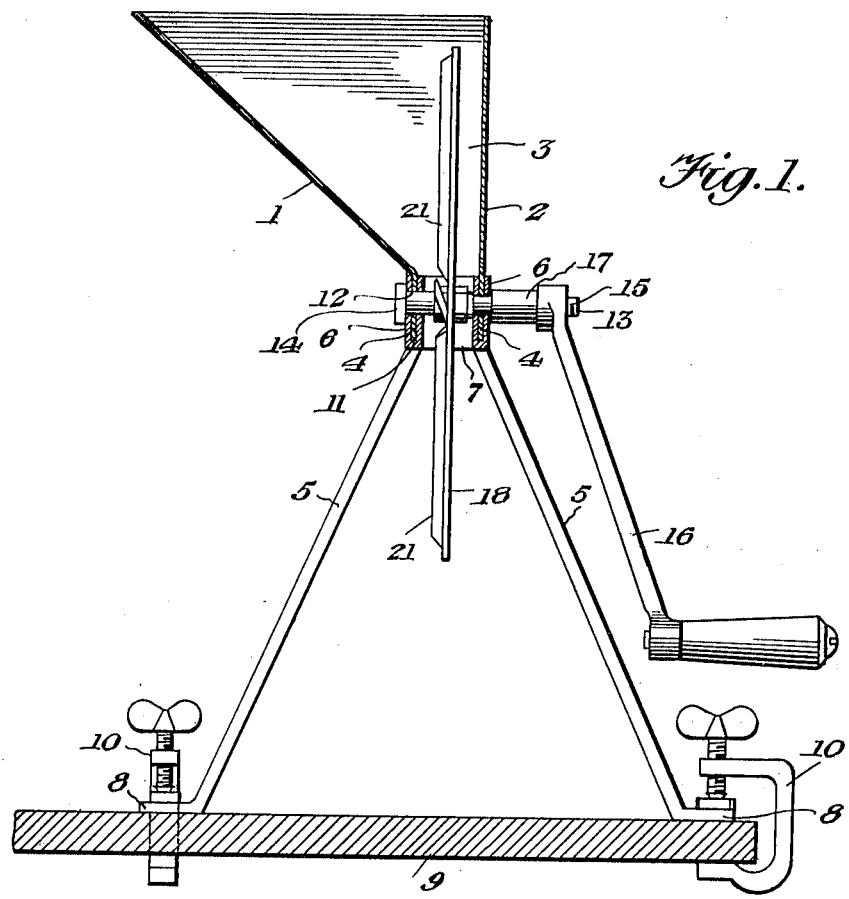
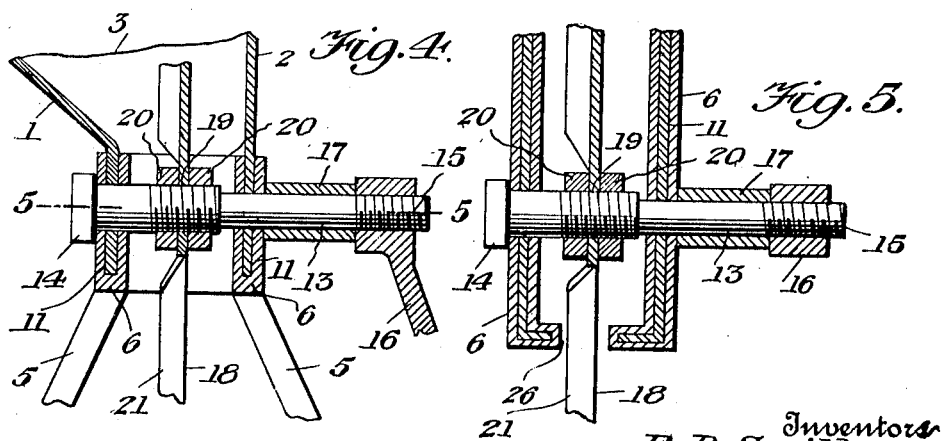

UNITED STATES PATENT OFFICE.

ROLLAND D. SMITH AND HARRY A. STEELE, OF CLEVELAND, OHIO.

VEGETABLE-SLICER.

1,317,050.  Specification of Letters Patent.  Patented Sept. 23, 1919.

Application filed December 16, 1918. Serial No. 266,972.

*To all whom it may concern:*

Be it known that we, ROLLAND D. SMITH, HARRY A. STEELE, citizens of the United States, residing at Cleveland, in the county of Cuyahoga and State of Ohio, have invented new and useful Improvements in Vegetable-Slicers, of which the following is a specification.

This invention relates to vegetable slicers, the main object in view being to produce an exceedingly simple, effective and cheaply manufactured and maintained slicer of the character referred to in which a maximum sweep of the cutting blades within the hopper is provided for by the novel manner of mounting the shaft and cutting disk of the slicer with relation to the bottom portion of the hopper where the outlet orifice of the hopper is located.

A further object of the invention is to provide a novel construction and arrangement of the walls of the hopper in relation to the rotary shaft of the slicer whereby maximum efficiency is produced in the operation of the machine.

A further object of the invention is to so mount the hopper upon a supporting stand in an elevated position that the hopper and stand are detachably fastened together by the rotary shaft of the device which is removable, enabling the cutting disk and hopper and stand to be separated from each other for cleaning purposes, thus rendering the device sanitary as a whole.

With the above and other objects and advantages in view the invention consists in the novel construction, combination and arrangement of parts herein fully described, illustrated and claimed.

In the accompanying drawings:—

Figure 1 is a vertical transverse section through the slicer.

Fig. 4 is an enlarged fragmentary vertical transverse section taken adjacent to the shaft and showing the connection between the hopper and the supporting stand.

Fig. 5 is a section on the line 5—5 of Fig. 4.

Figure 2:
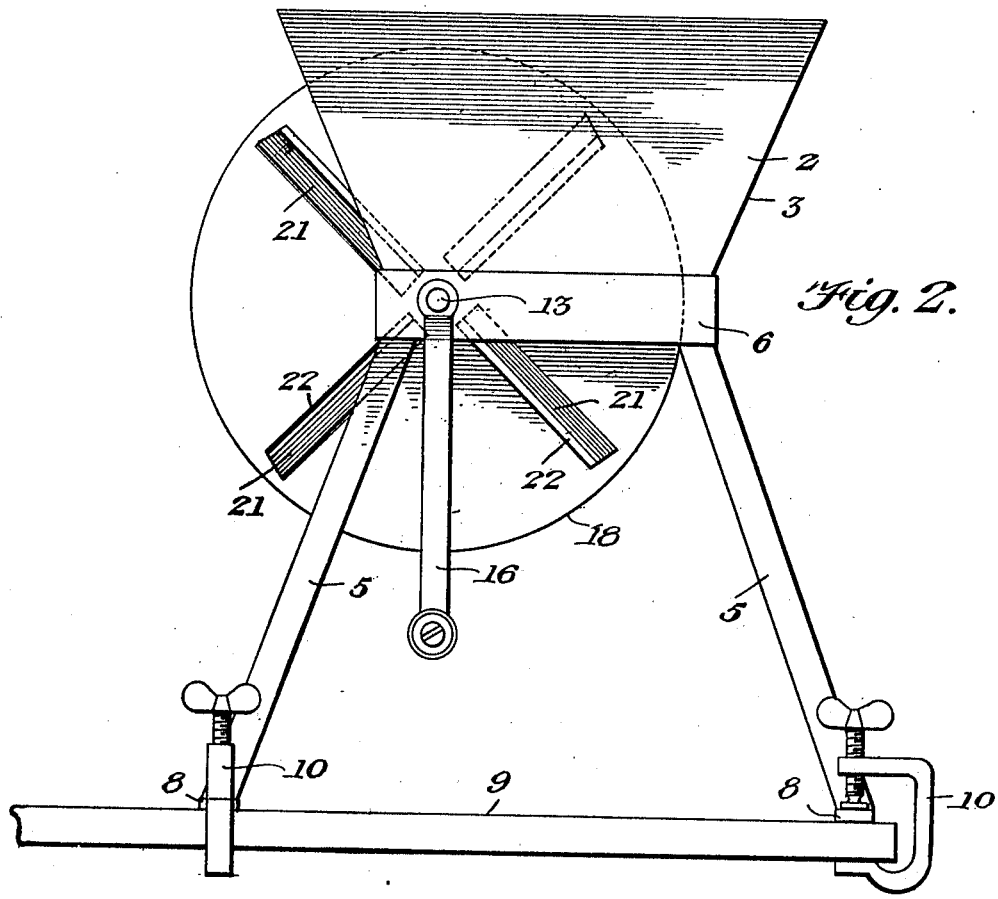
Fig. 2 is a front elevation of the slicer.
Figure 3:
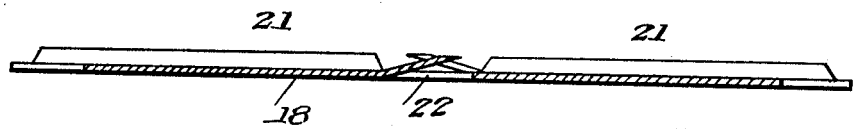
Fig. 3 is a vertical diametrical section through the disk shaped cutter showing one of the cutting blades and discharge orifices.

In carrying out the present invention, we employ a hopper having an inclined front wall 1, a substantially upright rear wall 2 and inclined end walls 3. The front side wall 1 and the end wall 3 converge downwardly toward the bottom of the hopper as clearly shown in Figs. 1 and 2. The front and rear side walls 1 and 2 have their lower marginal portions extending downwardly to provide parallel flanges 4 which are arranged in spaced relation to each other to provide an elongated outlet orifice for the slices removed from the vegetables by the rotary cutter hereinafter described.

In connection with the hopper, above described, we employ a supporting stand for holding said hopper at an elevation. Said supporting stand comprises a plurality of inclined and downwardly diverging legs 5, the upper extremities of which being connected together by longitudinal and transverse frame members 6 and 7 respectively. The lower extremities of the legs 5 are preferably extended horizontally to provide clamping feet 8 adapted to be fastened to a table or other horizontal supporting member 9 by means of clamps 10 or equivalent fastening means.

The longitudinal frame members 6 are formed with channels 11 adapted to receive the flanges 4 at the bottom of the hopper as most clearly illustrated in Fig. 4, the feature just referred to being a part of the means for detachably fastening the hopper to its subordinate stand. The flanges 4 and the frame members 6 are formed with alining openings 12 to receive a rotary shaft 13 which therefore has its bearing in said members 4 and 6. The shaft 13 has a head or stop shoulder 14 at one end thereof and the other end portion of said shaft is threaded as shown at 15, adapting an operating crank handle 16 to be threaded thereon. A spacing collar or sleeve 17 surrounds the shaft 13 between the operating crank handle 16 and the adjacent longitudinal frame member 6 of the supporting stand, said collar or sleeve serving to prevent endwise movement of said shaft. It will now be understood that when the rotary shaft is in place, the hopper is fastened securedly to the supporting stand.

Fastened upon the shaft 13 is a disk shaped rotary cutter 18 having a central hole 19 to receive the shaft 13, said cutter being fastened to the shaft by means of nuts 20 threaded upon said shaft and bearing upon the opposite side faces of the disk shaped cutter. The cutter 18 in the preferred embodiment of the invention is provided with a plurality of radially extending cutting blades 21 formed by plunging out a portion of the metal at intervals, the formation of said cutting blade also providing radially extending discharge orifices 22 which lie immediately adjacent to the cutting blade and allow the slices of vegetables to pass through the disk shaped cutter after which they fall through the bottom discharge orifice of the hopper and into a suitable receptacle placed under the stand and between the legs thereof.

By reason of the construction and arrangement hereinabove described it will now be seen that each of the cutting blades 21 extends practically the whole length of the outlet orifice of the hopper, this being due to the location of the rotary shaft 13 which will be seen is arranged in one of the bottom corners of the hopper at the point of nearest convergence of the inclined front side wall of the hopper and the inclined and downwardly converging end walls thereof. In order to accommodate such location of the shaft 13, one of the end walls of the hopper is formed with an upright slot 23 through which the disk shaped cutter 18 works. It will also be understood that the shaft 13 may be removed by detaching the operating crank handle and by removing the rotary cutter. This enables said shaft to be withdrawn from its position and also permit the hopper and its supporting stand to be separated. The several parts of the slicer may be then thoroughly cleaned in order to maintain the device as a whole in a thoroughly sanitary condition. The main features of the invention reside in the location of the shaft 13, the relation of the disk-shaped cutter to the hopper, and the means for detachably fastening the hopper to its supporting stand.

We claim:—

1. In a vegetable slicer, a hopper having an upright side wall, an inclined side wall opposite thereto and two inclined end walls, all of said inclined walls converging downwardly toward the bottom of the hopper, said side walls having their lower marginal portions extended downwardly to form parallel flanges in spaced relation to each other, a rotary shaft passing through said flanges in one of the bottom corner angles where the two side walls and one of the end walls most nearly converge and a disk-shaped rotary cutter fast on said shaft and wedging through a slot in one of the end walls of the hopper, said cutter having a slicing blade and a slice discharging orifice substantially radial to said shaft and reaching nearly the full length of the hopper bottom.

2. In a vegetable slicer, a hopper having an upright side wall, an inclined side wall opposite thereto and two inclined end walls, all of said inclined walls converging downwardly toward the bottom of the hopper, said side walls having their lower marginal portions extended downwardly to form parallel flanges in spaced relation to each other, a rotary shaft passing through said flanges in one of the bottom corner angles where the two side walls and one of the end walls most nearly converge, a disk-shaped rotary cutter fast on said shaft and wedging through a slot in one of the end walls of the hopper, said cutter having a slicing blade and a slide discharging orifice substantially radial to said shaft and reaching nearly the full length of the hopper bottom and a supporting stand having elevated horizontal frame members formed with channels which receive the bottom flanges of the hopper, said frame members and flanges having openings to detachably receive said shaft, the latter being removable therefrom.

In testimony whereof we affix our signatures.

ROLLAND D. SMITH.
HARRY A. STEELE.

Copies of this patent may be obtained for five cents each, by addressing the "Commissioner of Patents, Washington, D. C."